United States Patent
Itoh et al.

(10) Patent No.: US 7,458,024 B2
(45) Date of Patent: Nov. 25, 2008

(54) DOCUMENT PROCESSING DEVICE, DOCUMENT PROCESSING METHOD, AND STORAGE MEDIUM RECORDING PROGRAM THEREFOR

(75) Inventors: Atsushi Itoh, Ashigarakami-gun (JP); Michihiro Tamune, Ashigarakami-gun (JP); Masatoshi Tagawa, Ebina (JP); Naoko Sato, Ebina (JP); Shaoming Liu, Ashigarakami-gun (JP); Hiroshi Masuichi, Ashigarakami-gun (JP); Kiyoshi Tashiro, Kawasaki (JP); Kyosuke Ishikawa, Minato-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 686 days.

(21) Appl. No.: 11/080,624

(22) Filed: Mar. 16, 2005

(65) Prior Publication Data

US 2005/0278628 A1    Dec. 15, 2005

(30) Foreign Application Priority Data

Jun. 15, 2004    (JP)    ............................ 2004-177447

(51) Int. Cl.
*G06F 7/00*    (2006.01)
(52) U.S. Cl. .................... 715/271; 715/256; 715/261
(58) Field of Classification Search ............... 715/200, 715/229, 256, 261, 262, 271
See application file for complete search history.

(56) References Cited

U.S. PATENT DOCUMENTS

| | | | | |
|---|---|---|---|---|
| 5,671,067 | A * | 9/1997 | Negishi et al. | 358/403 |
| 6,792,145 | B2 * | 9/2004 | Gay | 382/190 |
| 7,239,406 | B1 * | 7/2007 | Piersol et al. | 358/1.15 |
| 2002/0103834 | A1 * | 8/2002 | Thompson et al. | 707/526 |
| 2002/0154816 | A1 * | 10/2002 | Gay | 382/190 |
| 2003/0212688 | A1 * | 11/2003 | Smith | 707/100 |
| 2004/0083134 | A1 * | 4/2004 | Spero t al. | 705/16 |
| 2004/0103367 | A1 * | 5/2004 | Riss et al. | 715/506 |
| 2005/0071283 | A1 * | 3/2005 | Randle et al. | 705/75 |

FOREIGN PATENT DOCUMENTS

| | | |
|---|---|---|
| CN | 2577349 Y | 10/2003 |
| JP | A-08-339418 | 12/1996 |
| JP | A-2003-157191 | 5/2003 |

* cited by examiner

*Primary Examiner*—Stephen S Hong
*Assistant Examiner*—Gregory J Vaughn
(74) *Attorney, Agent, or Firm*—Oliff & Berridge, PLC

(57) ABSTRACT

The present invention provides a document processing device including: a specifying unit that specifies character strings which have a common property across documents, from among character strings included in plural documents which are represented by plural corresponding document data; and a rewriting unit that rewrites, among the character strings specified by the specifying unit, character strings expressed in formats different from a defined format to character strings expressed in the defined format.

15 Claims, 5 Drawing Sheets

| CHARACTER STRING TO BE REWRITTEN | REWRITTEN CHARACTER STRING |
|---|---|
| '8* | 198* |
| '9* | 199* |
| '0* | 200* |
| JANUARY | 01 |
| FEBRUARY | 02 |
| ⋮ | ⋮ |
| NOVEMBER | 01 |
| DECEMBER | 02 |

LST

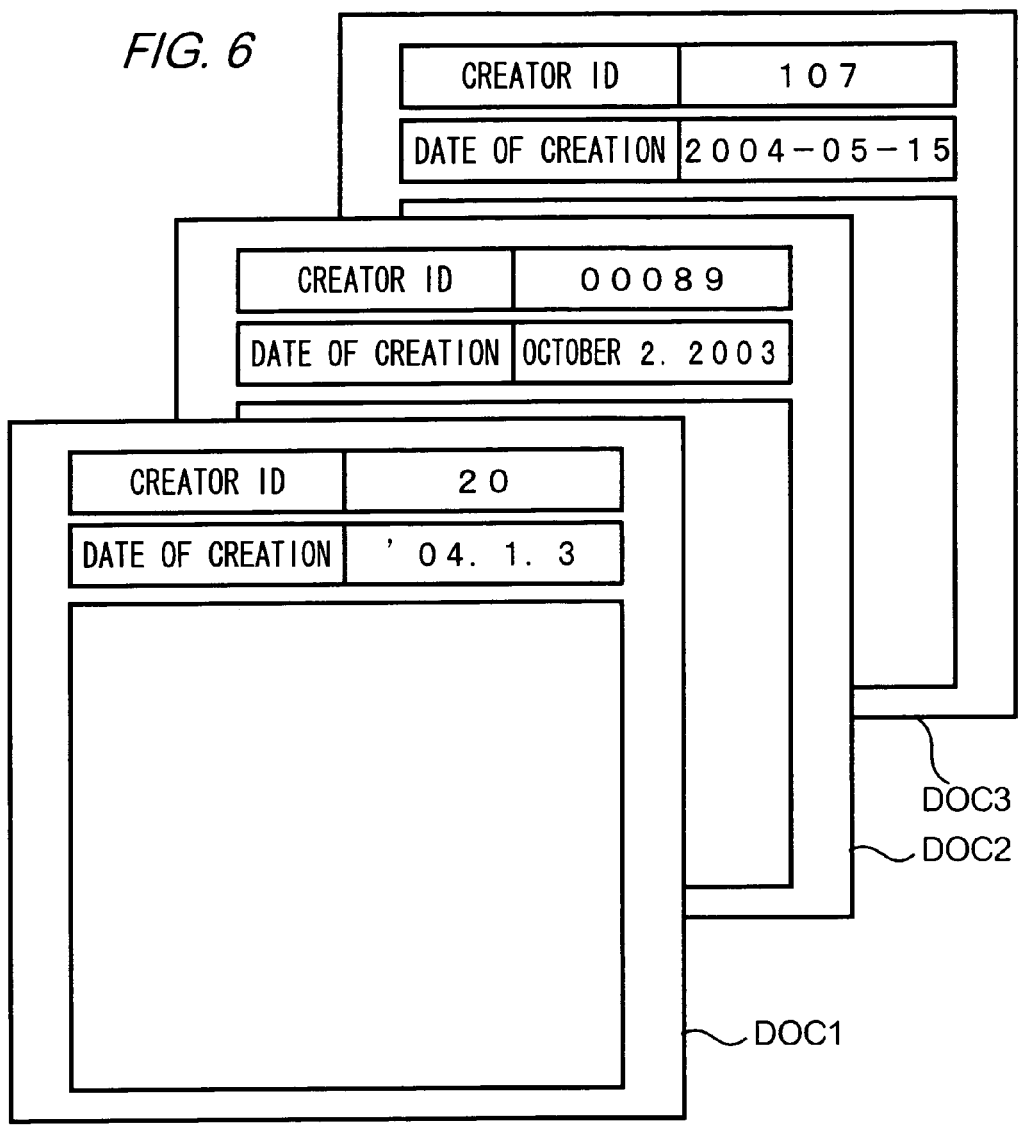

DOCUMENT PROCESSING DEVICE, DOCUMENT PROCESSING METHOD, AND STORAGE MEDIUM RECORDING PROGRAM THEREFOR

This application claims priority under 35 U.S.C. §119 of Japanese Patent Application No. 2004-177447 filed on Jun. 15, 2004, the entire content of which is hereby incorporated by reference.

BACKGROUND OF THE INVENTION

1. Field of the Invention

The present invention relates to a technique of classifying plural document data files.

2. Description of Related Art

It is known to provide a technique of reading a handwritten document using a scanner or an image reading device, recognizing characters by applying an OCR (Optical Character Recognition) process to the read document data file, and extracting the recognized characters as text data. According to the technique, by converting information described in a handwritten document into text data, a computer can use the information described in the handwritten document for a variety of purposes. For example, a computer can sort plural document data files based on character strings included in text data, or prepare statistics based on plural document data files.

However, character strings having a property which is common to all formats of a character string used in various documents conveying the same meaning can be expressed in any variety of forms in accordance with the preferences of the creators of the documents. For example, when considering a case of writing in a document a character string having a property of "date", e.g. a character string expressing "May 15, 2004", a user may write a character string in the format of "2004.05.15", or a character string in the format of "May 15, 2004". This is to say, although the character strings convey the same meaning but are written in different formats, a computer cannot recognize the character strings as same text data.

Accordingly, if the text data, "2004.05.15" and "May 15, 2004" are classified on the basis of a common property of "date", a computer cannot recognize date as being the common property in the two character strings by simply comparing the first characters in the text data, "2" and "M".

Therefore, it might not be possible to arrive at a common property that would match all formats of a character string expressing one specific meaning.

The present invention has been made in view of the problems discussed above and provides a technique of appropriately classifying plural document data which have one common property although being expressed in different formats.

SUMMARY OF THE INVENTION

To address the problems discussed above, the present invention provides a document processing device including: a specifying unit that specifies character strings which have a common property across documents, from among character strings included in plural documents which are represented by plural corresponding document data; and a rewriting unit that rewrites, among the character strings specified by the specifying unit, character strings expressed in formats different from a defined format to character strings expressed in the defined format.

With this document processing device, character strings having a common property specified by the specifying unit are rewritten to a defined format by the rewriting unit. As a result, plural document data including character strings expressed in different formats can be classified appropriately.

BRIEF DESCRIPTION OF THE DRAWINGS

Embodiments of the present invention will be described in detail based on the following figures, wherein:

FIG. 6 is a schematic diagram showing document data files used in an operation example according to the same embodiment;

FIG. 7 is a diagram showing text data of items in document data files used in a description of a second embodiment of the present invention;

DETAILED DESCRIPTION OF THE INVENTION

(1) First Embodiment

Figure 1:
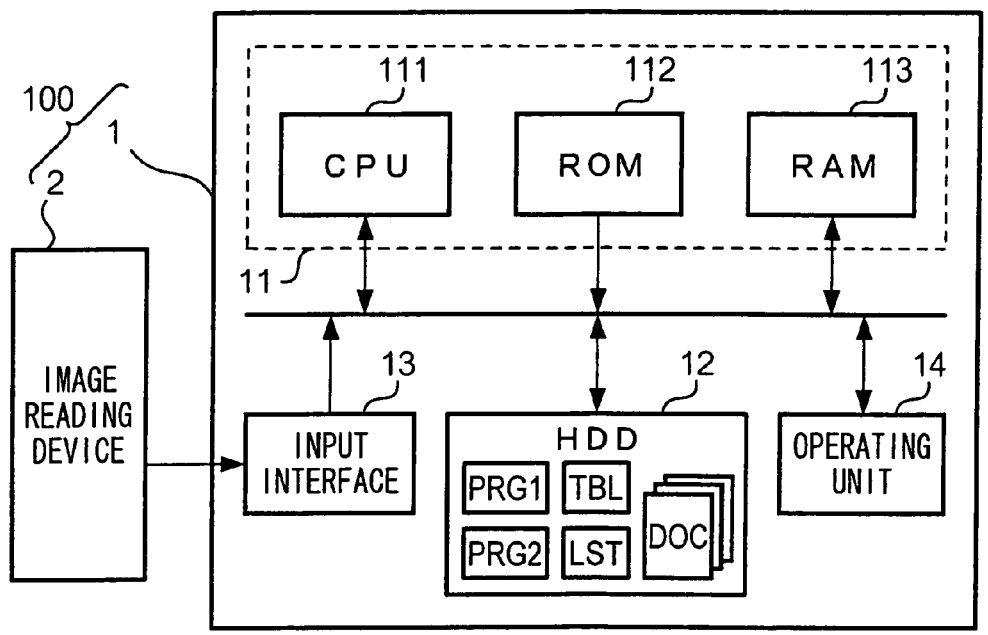
FIG. 1 is a block diagram showing a document processing system according to a first embodiment of the present invention.

FIG. 1 is a block diagram which shows a document processing system 100 according to a first embodiment of the present invention. As shown in this figure, the document processing system 100 includes a document processing device 1 and an image reading device 2. The document processing device 1 includes a control unit 11, an HDD 12, an input interface 13, and an operating unit 14.

The control unit 11 includes, for example, a CPU (Central Processing Unit) 111, a ROM (Read Only Memory) 112, and a RAM (Random Access Memory) 113, and executes various o1perations for performing an OCR process and a rewriting process, described below, on image data supplied by the image reading device 2. The HDD 12 is a storage device and stores an OCR process execution program PRG1, a rewriting process execution program PRG2, plural document data files DOC supplied from the image reading device 2, a Japanese calendar conversion table TBL, and a character string rewriting list LST. The input interface 13 is connected to the image reading device 2 and receives input of document image data by the image reading device 2. The operating unit 14 includes, for example, an LCD display, which is not illustrated, and various buttons, and receives instructions from a user. The user inputs instructions by pressing buttons or the like, while viewing screens displayed in the operating unit 14.

Figure 2:
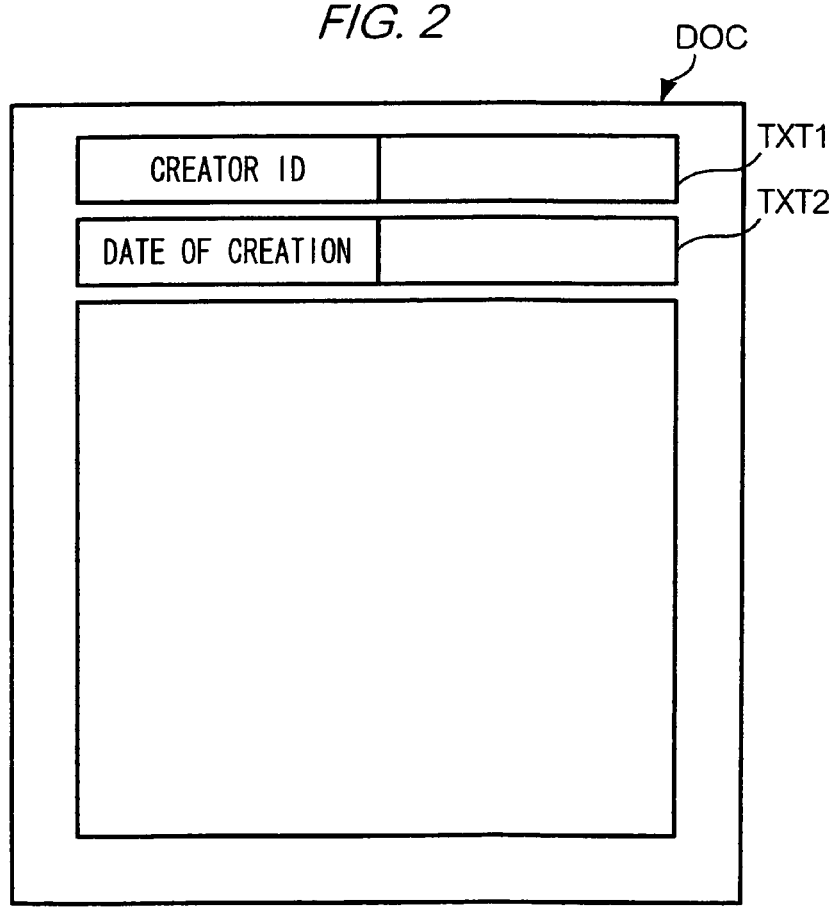
FIG. 2 is a schematic diagram showing a document data file stored in an HDD according to the same embodiment.

FIG. 2 is a schematic diagram showing a document data file DOC stored in the HDD 12. This document data file DOC is obtained by applying an OCR process to document image data supplied by the image reader device 2.

As shown in the figure, the document data file DOC includes two items, "Creator ID" and "Date of Creation" which indicate properties of the document data file DOC. Text data is input which indicates the above-mentioned items, "Creator ID" and "Date of Creation," in text fields TXT1 and TXT2, respectively.

Reference formats are defined for all items in the document data file DOC. The "Creator ID" has a reference format of "NNNNN," or a five-digit number, and for any document data file DOC wherein the "Creator ID" is not indicated by a five-digit number, this is rewritten as five digits by performing a rewriting process. The "Date of Creation" has a reference format of "YYYY-MM-DD." Here, YYYY signifies a year, MM a month, and DD a day. In other words, the reference format for "Date of Creation" expresses the year, month, and day in four-digit, two-digit, and two-digit numbers, respectively, with the year, month, and day separated by a hyphen (-).

Figures 3, 4:
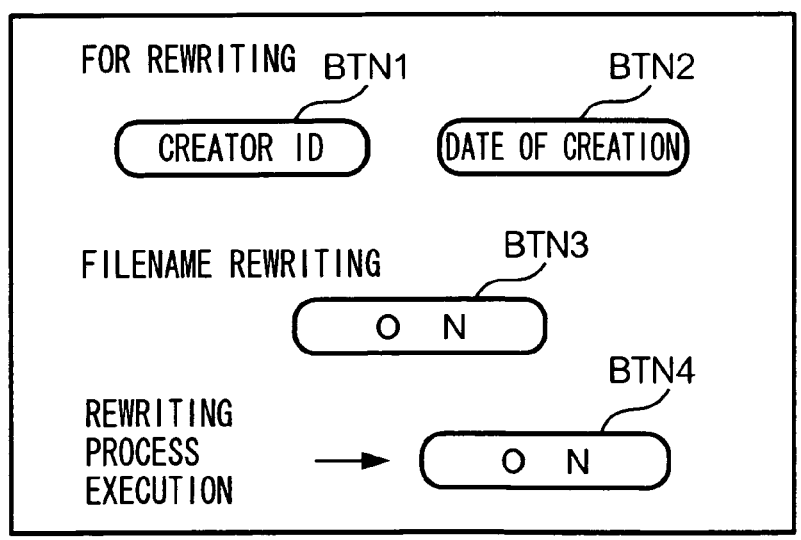
FIG. 3 is a diagram showing a character string rewriting list according to the same embodiment.
FIG. 4 is a diagram showing a screen displayed in an operating unit according to the same embodiment.

FIG. 3 is a diagram showing the character string rewriting list LST. The Character rewriting list LST is stored in the document processing device 1 in advance. When a rewriting process is performed for the "Date of Creation," if a character string which matches a "character string to be rewritten" in the character string rewriting list LST, then the character string is rewritten as the "rewritten character string." For example, if the "Date of Creation" contains characters such as "January"," the control unit 11 on the document processing device 1 rewrites them as "01". Further, if the "Date of Creation" item contains character strings such as "8*" or "9*," (with the asterisk (*) indicating an arbitrary integer), the control unit 11 rewrites these as a "198*" and "199*".

FIG. 4 is a diagram showing a screen displayed in the operating unit 14. As shown in the figure, rewriting selection buttons BTN1 and BTN2, a filename rewriting button BTN3, and a rewriting process execution button BTN4 are displayed in the screen. The following is a description of the buttons.

The rewriting selection buttons BTN1 and BTN2 are buttons for selecting text data to be rewritten in a rewriting process described below. The rewriting selection buttons BTN1 and BTN2 correspond to the "Creator ID" and "Date of Creation" items, respectively. Accordingly, when the rewriting selection button BTN1 is "ON" state, the control unit 11 is set to perform a rewriting process for text data indicating the "Creator ID," and when the rewriting selection button BTN2 is "ON" state, the control unit 11 is set to perform a rewriting process for text data indicating the "Date of Creation." The filename rewriting button BTN3 is a button for selecting whether to rewrite the filename of the document data when a rewriting process is executed, and when this button is "ON" state, a filename is rewritten when a rewriting process is executed. The rewriting process execution button BTN4 is a button for instructing execution of a rewriting process, and when this button is "ON" state, a rewriting process is started.

The image reading device 2 is a scanner. The image reading device 2 includes a platen, a light source, an optical system, a light-receiving element, and a signal processing unit, which are not illustrated. Light is shone by the light source on a document placed on the platen, and the light-receiving element receives the reflected light via the optical system and outputs an image signal. The output image signal is subjected by the signal processing unit to various signal processes such as an AD conversion and a shading correction, and the resultant document image data is supplied to the document processing device 1.

In the document processing system 100 stated above, the image reading device 2 reads a handwritten document and supplies document image data to the document processing device 1. The document processing device 1, into which the document image data has been input, applies a commonly known OCR process on the document image data by executing the program PRG1 and achieves a document data file wherein text data corresponding to the items such as the "Creator ID" and "Date of Creation" can be extracted from the document image data. The document processing device 1 performs a rewriting process on text data included in the document data file by executing the program PRG2 in accordance with instructions from the user.

Figure 5:
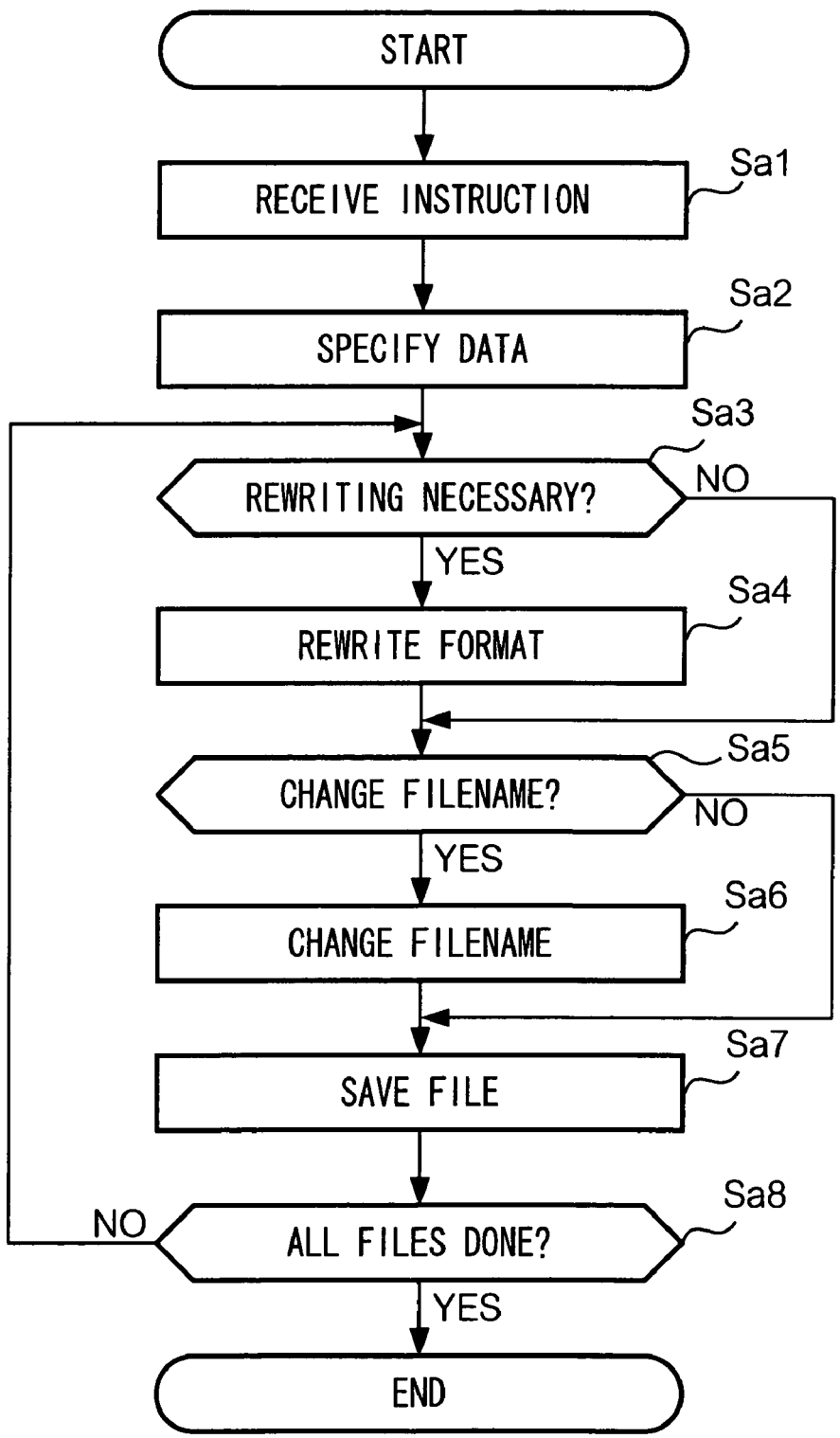
FIG. 5 is a flowchart showing a rewriting process executed by a document processing device according to the same embodiment.

FIG. 5 is a flowchart showing a rewriting process executed by the document processing device 1 according to the present embodiment. As shown in the figure, firstly, the control unit 11 of the document processing device 1 receives an instruction input by a user via the operating unit 14 (step Sa1). Specifically, the user, while viewing a screen as shown in FIG. 4, specifies items to be rewritten using rewriting selection buttons BTN1 and BTN2, selects whether to rewrite a filename using the filename rewriting button BTN3, and instructs start of a rewriting process using the rewriting process execution button BTN4.

When the instruction is received from the user, the control unit 11, in accordance with the instruction, specifies text data corresponding to the items to be rewritten in plural document data files (step Sa2). Specifically, the control unit 11 searches the document data files for text data corresponding to the items designated by the rewriting selection buttons BTN1 or BTN2.

The control unit 11 reads one document data file into the RAM 113 and determines whether it is necessary to rewrite the document data file (step Sa3). If this document data file contains text data to be written, and this text data is described in a format different from the reference format (step Sa3: YES), the control unit 11 rewrites the text data in the reference format (step Sa4). On the other hand, if the text data is described in the reference format (step Sa3: NO), the control unit 11 skips the process in step Sa4 described above.

The control unit 11, in accordance with the instruction, determines whether to rewrite the filename of the document data file (step Sa5). If the user has instructed the start of the rewriting process with the filename rewriting button BTN3 "ON" state (step Sa5: YES), the control unit 11 rewrites the filename of the document data file (step Sa6). Specifically, the control unit 11 adds to the end of the filename, the item name of text data which has been rewritten in step Sa4. For example, if the filename of the document data file is "ABC", and text data corresponding to the item "Date of Creation" has been written, the filename is rewritten as "ABC_Date of Creation".

If the user has instructed the start of the rewriting process with the filename rewriting button BTN3 "OFF" state (step Sa5: NO), the control unit 11 skips the process in step Sa6.

When the processes are completed, the control unit 11 stores in the HDD 12 the document data file processed in the RAM 113 (step Sa7). The control unit 11 may overwrite an unprocessed document data file stored on the HDD 12, or may store it as a new document data file.

The control unit 11 performs the processes in steps Sa3 through Sa7 on all document data files specified in step Sa2. If there are document data files to be rewritten left (step Sa8: NO), the control unit 11 repeats the processes in steps Sa3 through Sa7. When the processes for all document data files to be rewritten have been completed (step Sa8: YES), the control unit 11 terminates the rewriting process.

According to the rewriting process, formats of the items "Creator ID" and "Date of Creation" are standardized among plural document data files. Consequently, the plural document data files can be sorted based on the items. Additionally, if the filenames also have been rewritten, a user can easily identify which document data files have been rewritten.

In the following, a description of the rewriting process will be made in greater detail with reference to specific examples, to thereby facilitate comprehension of the present embodiment.

FIG. 6 is a diagram showing document data files DOC1, DOC2, and DOC3 referred to in the operation example discussed below. As shown in the figure, a creator ID of the document data file DOC1 is "20" and a date of creation thereof is "'04.1.3". Similarly, a creator ID and a date of creation of document data file DOC2 are "00089" and "Oct. 2, 2003", respectively, and a creator ID as a date of creation of document data file DOC3 are "107" and "2004-05-15", respectively. The filenames of the document data files DOC1, DOC2, and DOC3 are assumed to be "DOC1", "DOC2", and "DOC3", respectively.

If the document data files DOC1, DOC2, and DOC3 are sorted by creator ID, it is determined that the value of a creator ID gets larger in the order DOC2, DOC3, and DOC1. However, if the actual values of the creator IDs are compared, the creator ID gets larger in the order DOC1, DOC2, and DOC3. In other words, the document data files DOC1, DOC2, and DOC3 shown in FIG. 6 cannot be appropriately sorted based on the creator ID.

Furthermore, if the document data files DOC1, DOC2, and DOC3 are sorted by date of creation, it is determined that the date of creation gets newer in the order DOC1, DOC3, DOC2. However, the actual order of the date of creation goes from oldest to newest in the order DOC2, DOC1, DOC3. Therefore, as in the case of the creator ID described above, the document data files DOC1, DOC2, and DOC3 cannot be appropriately sorted based on the date of creation.

In the following operation example 1, a rewriting process for the item "Creator ID" of the document data files DOC1, DOC2, and DOC3 is described. In the following operation example 2, a rewriting process for the item "Date of Creation" is described. In the operation example 2, a process of modifying filenames is also described.

The present operation example describes a case where a document processing device 1 rewrites a creator ID and does not modify filenames. In other words, this operation example illustrates operations performed in a case where a rewriting process is executed with the rewriting selection button BTN1 "ON" on state and with the filename rewriting button BTN3 "OFF" state.

A rewriting process for the creator ID of document data file DOC1 is described. In this case, the creator ID is 20, while a reference format for the creator ID is "NNNNN." Accordingly, a control unit 11 rewrites the creator ID as "00020" by adding three "0"s.

Similarly, when rewriting the creator ID of document data file DOC3, the creator ID "107" is rewritten as "00107".

In contrast, the creator ID of document data file DOC2 is "00089", which matches the reference format for the creator ID. Therefore, the control unit 11 does not rewrite the creator ID for the document data file DOC2.

According to the rewriting process, the creator IDs of the document data files DOC1, DOC2, and DOC3 are rewritten to "00020," "00107," and "00089," respectively. Consequently, if the rewritten document data files DOC1, DOC2, and DOC3 are sorted by creator ID, it is determined that the creator ID gets larger in the order DOC1, DOC3, and DOC2. Namely, it becomes possible to appropriately sort the document data files DOC1, DOC2, and DOC3 by creator ID.

The present operation example describes a case where a document processing device 1 rewrites a date of creation and modifies filenames. In other words, the operation example describes operations performed in a case where a rewriting process is executed with the rewriting selection button BTN2 "ON" state and with the filename rewriting button BTN3 "ON" state.

A rewriting process for the date of creation of a document data file DOC1 is described. The date of creation of the document data file DOC1 is "'04.1.3", and the reference format for the date of creation is "YYYY-MM-DD". The control unit 11 refers to the character string rewriting list LST and rewrites character strings which match "character strings to be rewritten" in the list. Specifically, the control unit 11 rewrites "04" as "2004", and rewrites the period (.) as a hyphen (-). As a result of the rewriting operations, the date of creation for the document data file DOC1 becomes "2004-1-3." However, this format differs from the reference format in the digit number of the month and the day. Therefore, the control unit 11 rewrites the date of creation of the document data file DOC1 as "2004-01-03" by adding one "0" to the month and the day, respectively.

When the rewriting of the date of creation is completed, the control unit 11 rewrites the filename of the document data file DOC1. In this case, the filename "DOC1" of the document data file DOC1 is modified to, for example, "DOC1_Date of Creation".

A rewriting process for a date of creation of a document data file DOC2 is described. The date of creation for the document data file DOC2 is "Oct. 2, 2003", and the reference format for the date of creation is "YYYY-MM-DD." The control unit 11 refers to the character string rewriting list LST and rewrites the character strings which match "character strings to be rewritten" in the list. Specifically, the control unit 11 rewrites the "October" as "10". The control unit 11 recognize the character ", 2003" as a year and adds a "0" to the day to conform the digit number of the day to that of the reference format. Then, the control unit 11 changes the order of the characters to match them to the reference format. As a result, the date of creation of the document data file DOC2 becomes "2003-10-02."

When the rewriting of the date of creation is completed, the control unit 11 rewrites the filename of the document data file DOC2. In this case, the filename "DOC2" of the document data file DOC2 is modified to, for example, "DOC2_Date of Creation".

The date of creation of the document data file DOC3 is "2004-05-15," and this matches the reference format for the date of creation "YYYY-MM-DD". Therefore, the control unit 11 ends the rewriting process without rewriting the date of creation of the document data file DOC3.

As a result of the rewriting process, the date of creation for the document data files DOC1, DOC2, and DOC3 to "2004-01-03," "2003-10-02," and "2004-05-15," respectively. If the rewritten document data files DOC1, DOC2, and DOC3 are sorted by date of creation, it is determined that the date of creation gets newer in the order DOC2, DOC1, DOC3. Namely, it becomes possible to appropriately sort the document data files DOC1, DOC2, and DOC3 by data of creation.

Additionally, since the filenames of the document data files DOC1 and DOC2 to "DOC1_Date of Creation" and "DOC2_Date of Creation", a user can easily understand that the creation dates of the document data files DOC1 and DOC2 have been rewritten.

(2) Second Embodiment

Below is a description of a second embodiment according to the present invention.

The present embodiment differs from the first embodiment only in that reference formats for the items "Creator ID" and "Date of Creation" are not defined in advance, but defined based on a result of a classification of document data files for a rewriting process. Therefore, the present embodiment describes differences with the first embodiment mainly, and descriptions which overlap with those of the first embodiment will be omitted. Elements shared with the first embodiment are denoted by like numerals, whereas elements different from those of the first embodiment are distinguished by an apostrophe (').

A document processing device 1' according to the present embodiment stores in an HDD12' a program PRG2' for executing a rewriting process, which is different from the first embodiment. Therefore, a rewriting process executed by a control unit 11 using the program PRG2' will be described below in detail.

FIG. 7 is a diagram showing text data of items in document data files DOCa, DOCb, . . . , DOCe referred to in the following description of the present embodiment. For example, a creator ID of the document data file DOCa is "00016", and a date of creation thereof is "2003-12-10".

Below is a description of a case where a rewriting process for the item "Date of Creation" of each of the document data files DOCa through DOCe is performed by the control unit 11.

Figure 8:
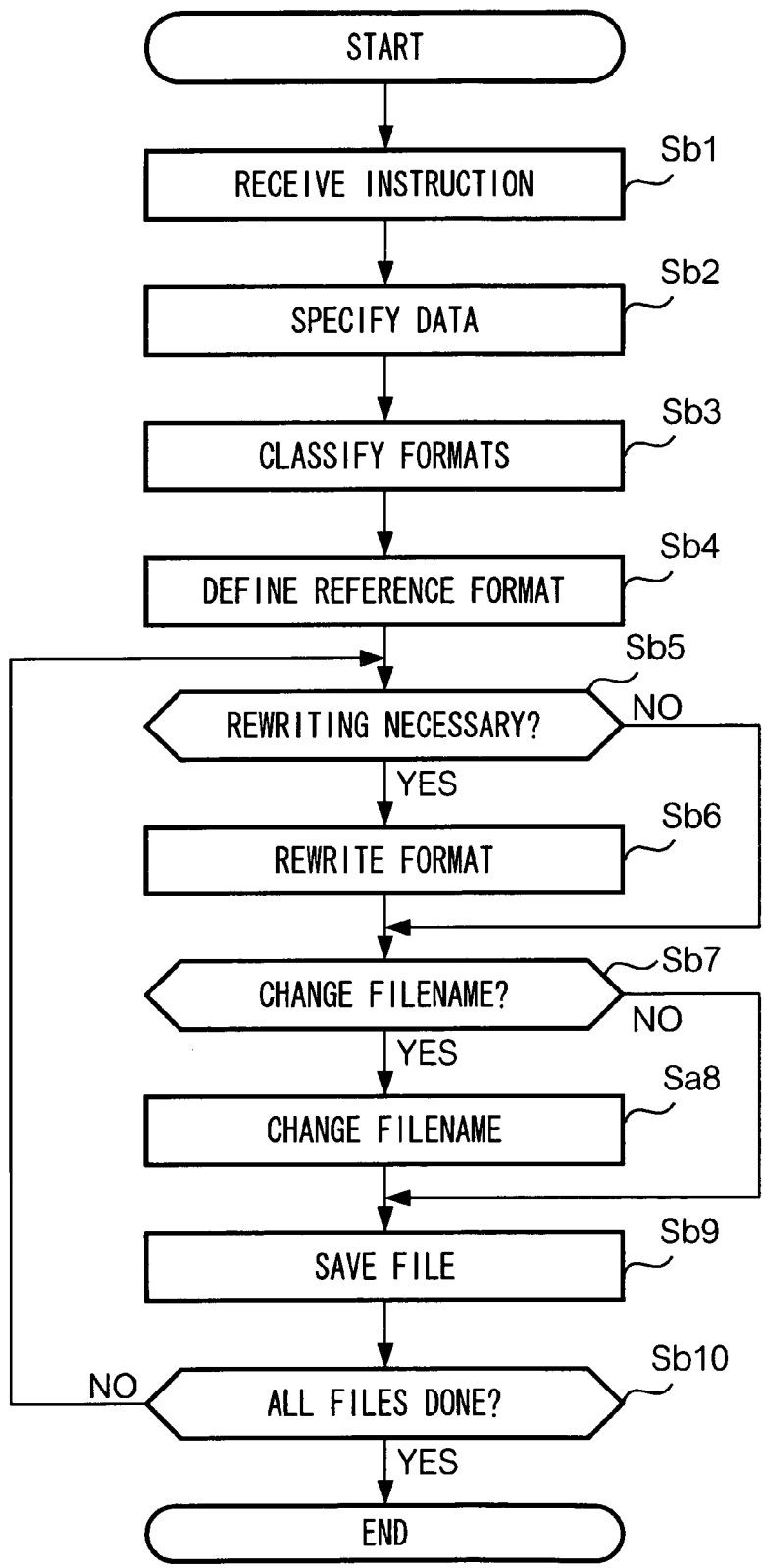
FIG. 8 is a flowchart showing a rewriting process executed by a document processing device according to the same embodiment.

FIG. 8 is a flowchart showing a rewriting process executed by the document processing device 1' according to the present embodiment. As shown in the figure, firstly, the control unit 11 of the document processing device 1' receives an instruction input by a user via the operating unit 14 (step Sb1). Specifically, the user, while viewing a screen as shown in FIG. 4, instructs rewriting of the item "Date of Creation" using the rewriting selection button BTN2, and instructs start of a rewriting process using the rewriting process execution button BTN4.

When the instruction is received from the user, the control unit 11, in accordance with the instruction, specifies text data corresponding to the item to be rewritten in plural document data files (step Sb2). Specifically, the control unit 11 searches the document data files for text data corresponding to the item designated by the rewriting selection buttons BTN2.

The control unit 11 reads the text data specified in step Sb2 and classifies them by format (step Sb3). This process is described below with reference to the document data files DOCa through DOCe of FIG. 7.

First, the control unit 11 reads the text data of the document data file DOCa corresponding to the item "Date of Creation". The date of creation of the document data file DOCa is "2003-12-10," so the control unit 11 defines this "YYYY-MM-DD" format as "format A". Additionally, the control unit 11 stores a value "1" as the appearance frequency of the format A.

Next, the control unit 11 reads the text data of the document data file DOCb corresponding to the item "Date of Creation". The date of creation of the document data file DOCb is "2004.02.02", which is a different format from the format A, so the control unit 11 defines the format as "format B", and stores a value "1" as the appearance frequency of the format B.

Next, the control unit 11 reads the text data of the the document data file DOCc corresponding to the item "Date of Creation". The date of creation of the document data file DOCc is "2004-03-29", and this format matches the format A. The control unit 11 adds "1" to the appearance frequency of this format A, and stores a value "2" as the appearance frequency of this format A. Since the date of creation of the document data file DOCd is "2004-01-23" and in "format A" as in the document data file DOCc, the control unit 11 once again adds "1" to the stored appearance frequency of this format A, and stores a value "3" as the appearance frequency of this format A.

Next, the control unit 11 reads the text data of the document data file DOCe corresponding to the item "Date of Creation". The date of creation of the document data file DOCe is "Oct. 7, 2003", so this format does not match either the format A or the format B. The control unit 11 defines this format as "format C", and stores a value "1" as the appearance frequency of the format C.

When formats of all the document data files are specified and classified, the control unit 11 identifies the format which has appeared most frequently and sets the format as the reference format (step Sb4). In the example described above, the appearance frequency of the "format A" is "3" times, the appearance frequency of the "format B" is "1" time, and the appearance frequency of the "format C" is "1" time, so the control unit 11 defines the "format A" as the reference format.

The control unit 11 reads one document data file into the RAM 113 and determines whether it is necessary to rewrite the document data file (step Sb5). If this document data file contains text data to be written, and this text data is described in a format different from the reference format (step Sb5: YES), the control unit 11 rewrites the text data in the reference format (step Sb6). On the other hand, if the text data is described in the reference format (step Sb5: NO), the control unit 11 skips the process in step Sb6 described above. Taking the document data files DOCa through DOCe of FIG. 7 as an example, in cases of the document data files DOCa, DOCc, and DOCd, whose date of creation is described in the reference format, the process in step Sb6 is skipped. On the other hand, in cases of the document data files DOCb and DOCe, whose date of creation is described in a different format from the reference format, the text data are rewritten to "2004-02-02" and "2003-10-07", respectively.

Next, the control unit 11, in accordance with the instruction, determines whether to rewrite the filename of the document data file (step Sb7). If the user has instructed the start of the rewriting process with the filename rewriting button BTN3 "ON" state (step Sb7: YES), the control unit 11 rewrites the filename of the document data file (step Sb8). Specifically, the control unit 11 adds to the end of the filename, the item name of text data which has been rewritten in step Sb6.

If the user has instructed the start of the rewriting process with the filename rewriting button BTN3 "OFF" state (step Sb7: NO), the control unit 11 skips the process in step Sb8.

When the processes are completed, the control unit 11 stores in the HDD 12' the document data file processed in the RAM 113 (step Sb9). The control unit 11 may overwrite an unprocessed document data file stored on the HDD 12', or may store it as a new document data file.

The control unit 11 performs the processes in steps Sb5 through Sb9 on all document data files specified in step Sb2. If there are document data files to be rewritten left (step Sb10: NO), the control unit 11 repeats the processes in steps Sb5 through Sb9. When the processes for all document data files to be rewritten have been completed (step Sb10: YES), the control unit 11 terminates the rewriting process.

As discussed above, the document processing device 1' according to the present embodiment, even in a case where a reference format is not defined in advance, classifies document data files for a rewriting process, identifies the format which has appeared most frequently, and performs a rewriting process using the identified format as a reference format. Accordingly, it is no longer required that a reference format is defined in advance, and it becomes possible to minimize the number of document data files to be rewritten.

(3) Modifications

The present invention can be implemented in embodiments such as the following other than the embodiments stated above.

In the above embodiments, a document data file on which a rewriting process is performed by a document processing device may be one other than a document data file obtained by applying an OCR process to document image data supplied by an image reader device. In essence, any file format can be adapted from which text data can be extracted such as a CSV (Comma Separated Values) format or HTML (HyperText Markup Language) format.

In the above embodiments, text data in a document data file may be one which has been input by a user using a keyboard or other input device. In this case, there is a possibility that characters entered by the user may include both single-byte and double-byte characters, so it would be advantageous to perform a rewriting process for standardizing the formats of the characters.

In the above embodiments, a rewriting of a filename may be performed on document data files other than document data files whose text data has been rewritten.

In the above embodiments, when a filename of a document data file is rewritten, an item name may be attached to the top of the filename instead of the end of the filename. Alternatively, text data may be attached to the filename instead of an item name. For example, if a filename of a document data file is "DOCA" and its date of creation is "2004-02-27," the filename is modified to "2004-02-27_DOCA." In this case, since text data whose format has been standardized is attached to the top of a filename, document data files can be listed in the order of date of creation when sorted by filename.

In the second embodiment, a control unit of a document processing device, instead of setting the format which has appeared most frequently as a reference format, may cause a LCD display of an operating unit to display a result of a classification of document data files, and thereby allow a user to select a reference format.

The programs PRG2 and PRG2' according to the present invention can by provided through a variety of storage media such as a magnetic disk, a floppy™ disk, a CD (Compact Disk), a DVD (Digital Versatile Disk), or RAM.

As discussed above, the present invention provides a document processing device including: a specifying unit that specifies character strings which have a common property across documents, from among character strings included in plural documents which are represented by plural corresponding document data; and a rewriting unit that rewrites, among the character strings specified by the specifying unit, character strings expressed in formats different from a defined format to character strings expressed in the defined format.

With the document processing device, character strings having a common property specified by the specifying unit are rewritten to a defined format by the rewriting unit. As a result, plural document data including character strings expressed in different formats can be classified appropriately.

According to one embodiment of the present invention, the document processing device further includes a classifying unit that classifies formats of character strings specified by the specifying unit; and a defining unit that defines a reference format based on a classification result provided by the classifying unit, and the rewriting unit rewrites, among the character strings specified by the specifying unit, character strings expressed in formats different from a reference format defined by the defining unit to character strings expressed in the reference format.

According to another embodiment of the present invention, the defining unit defines as the reference format a format with a highest appearance frequency from among formats classified by the classifying unit.

In the embodiment, plural document data are classified, and character strings therein are rewritten in a reference format defined based on the classification result, so a more appropriate format can be used.

According to another embodiment of the present invention, the document processing device further includes a display that displays a list of plural formats which are a classification result of the classifying unit; and a selecting unit that selects a format from a list of plural formats displayed by the display according to an operation of the operator, and the rewriting unit rewrites, among the character strings specified by the specifying unit, character strings expressed in formats different from a format selected by the selecting unit to character strings expressed in the selected format.

In the embodiment, a user can select a format for rewriting.

According to another embodiment of the present invention, the document processing device further includes a filename rewriting unit that rewrites a filename of document data whose character string has been rewritten by the rewriting unit to a filename including at least a portion of the rewritten character string.

In the embodiment, an operator can see how document data has been rewritten only by looking at the filename of the document data.

According to another embodiment of the present invention, the document processing device further includes a filename rewriting unit that rewrites a filename of document data whose character string has been rewritten by the rewriting unit to a filename including at least a portion of a name indicating a property of the rewritten character string.

In the embodiment, an operator can see how document data has been rewritten only by looking at the filename of the document data.

According to another embodiment of the present invention, the document processing device further includes a rewriting selection unit that allows an operator to select whether to rewrite a filename, and the filename rewriting unit rewrites a filename of document data whose character string has been rewritten by the rewriting unit when the rewriting selection unit has received an instruction from an operator to rewrite the filename.

In the embodiment, an operator can determine whether to rewrite a filename.

According to another embodiment of the present invention, the document data is obtained by applying an OCR (Optical Character Recognition) process to an optically-read document.

In the embodiment, plural document data can be appropriately classified if they are written in different formats.

Also, the present invention provides a document processing method performed by a document processing device, including: specifying character strings which have a common property across documents, from among character strings included in plural documents which are represented by plural corresponding document data; and rewriting, among character strings specified in the specifying step, character strings expressed in formats different from a defined format to character strings expressed in the defined format.

According to one embodiment of the invention, the document processing method further includes: classifying formats of character strings specified in the specifying step; and defining a reference format based on a result of a classification in the classifying step, and the character string rewriting step includes rewriting, among character strings specified in the specifying step, character strings expressed in formats different from a reference format defined in the defining step to character strings expressed in the reference format.

According to another embodiment of the invention, the defining step includes defining as the reference format a format with a highest appearance frequency from among formats classified in the classifying step.

According to another embodiment of the invention, the document processing method further includes: displaying a list of plural formats which are a result of a classification in the classifying step; and selecting a format from a list of plural formats displayed in the displaying step according to an operation of the operator, and the character string rewriting step includes rewriting, among character strings specified in the specifying step, character strings expressed in formats different from a format selected in the format selecting step to character strings expressed in the selected format.

According to another embodiment of the invention, the document processing method further includes rewriting a filename of document data whose character string has been rewritten in the character string rewriting step to a filename including at least a portion of the rewritten character string.

According to another embodiment of the invention, the document processing method further includes rewriting a filename of document data whose character string has been rewritten in the character string rewriting step to a filename including at least a portion of a name indicating a property of the rewritten character string.

According to another embodiment of the invention, the document processing method further includes allowing an operator to select whether to rewrite a filename, and the filename rewriting step includes rewriting a filename of document data whose character string has been rewritten in the character string rewriting step when an instruction from an operator to rewrite the filename is received in the rewriting selection step.

According to another embodiment of the invention, the document data is obtained by applying an OCR (Optical Character Recognition) process to an optically-read document.

Furthermore, the present invention provides a computer-readable storage medium recording a program for causing a computer to execute: specifying character strings which have a common property across documents, from among character strings included in plural documents which are represented by plural corresponding document data; and rewriting, among character strings specified by the specifying process, character strings expressed in formats different from a defined format to character strings expressed in the defined format.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical application, to thereby enable others skilled in the art to understand other embodiments or modifications which can be applied to the particular use contemplated. It is intended that the scope of the invention be defined by the following claims and their equivalents.

What is claimed is:

1. A document processing device comprising:
    a specifying unit that specifies character strings which have a common property across documents, from among character strings included in a plurality of documents which are represented by a plurality of corresponding document data;
    a rewriting unit that rewrites, among the character strings specified by the specifying unit, character strings expressed in formats different from a defined format to character strings expressed in the defined format;
    a classifying unit that classifies formats of character strings specified by the specifying unit; and
    a defining unit that defines a reference format based on a classification result provided by the classifying unit,
    wherein the rewriting unit rewrites, among the character strings specified by the specifying unit, character strings expressed in formats different from a reference format defined by the defining unit to character strings expressed in the reference format; and
    wherein the defining unit defines as the reference format a format with a highest appearance frequency from among formats classified by the classifying unit.

2. The document processing device according to claim 1, further comprising:
    a display that displays a list of a plurality of formats which are a classification result of the classifying unit; and
    a selecting unit that selects a format from a list of a plurality of formats displayed by the display according to an operation of the operator,
    wherein the rewriting unit rewrites, among the character strings specified by the specifying unit, character strings expressed in formats different from a format selected by the selecting unit to character strings expressed in the selected format.

3. The document processing device according to claim 1, further comprising:
    a filename rewriting unit that rewrites a filename of document data whose character string has been rewritten by the rewriting unit to a filename including at least a portion of the rewritten character string.

4. The document processing device according to claim 1, further comprising:
    a filename rewriting unit that rewrites a filename of document data whose character string has been rewritten by the rewriting unit to a filename including at least a portion of a name indicating a property of the rewritten character string.

5. The document processing device according to claim 3, further comprising:
    a rewriting selection unit that allows an operator to select whether to rewrite a filename,
    wherein the filename rewriting unit rewrites a filename of document data whose character string has been rewritten by the rewriting unit when the rewriting selection unit has received an instruction from an operator to rewrite the filename.

6. The document processing device according to claim 4, further comprising:
    a rewriting selection unit that allows an operator to select whether to rewrite a filename,
    wherein the filename rewriting unit rewrites a filename of document data whose character string has been rewritten by the rewriting unit when the rewriting selection unit has received an instruction from an operator to rewrite the filename.

7. The document processing device according to claim 1, wherein the document data is obtained by applying an OCR (Optical Character Recognition) process to an optically-read document.

8. A document processing method performed by a document processing device, comprising:

specifying character strings which have a common property across documents, from among character strings included in a plurality of documents which are represented by a plurality of corresponding document data;

rewriting, among character strings specified in the specifying step, character strings expressed in formats different from a defined format to character strings expressed in the defined format;

classifying formats of character strings specified in the specifying step; and defining a reference format based on a result of a classification in the classifying step, wherein the character string rewriting step includes rewriting, among character strings specified in the specifying step, character strings expressed in formats different from a reference format defined in the defining step to character strings expressed in the reference format; and wherein the defining step includes defining as the reference format a format with a highest appearance frequency from among formats classified in the classifying step.

9. The document processing method according to claim 8, further comprising:

displaying a list of a plurality of formats which are a result of a classification in the classifying step; and selecting a format from a list of a plurality of formats displayed in the displaying step according to an operation of the operator, wherein the character string rewriting step includes rewriting, among character strings specified in the specifying step, character strings expressed in formats different from a format selected in the format selecting step to character strings expressed in the selected format.

10. The document processing method according to claim 8, further comprising:

rewriting a filename of document data whose character string has been rewritten in the character string rewriting step to a filename including at least a portion of the rewritten character string.

11. The document processing method according to claim 8, further comprising:

rewriting a filename of document data whose character string has been rewritten in the character string rewriting step to a filename including at least a portion of a name indicating a property of the rewritten character string.

12. The document processing method according to claim 10, further comprising:

allowing an operator to select whether to rewrite a filename, wherein the filename rewriting step includes rewriting a filename of document data whose character string has been rewritten in the character string rewriting step when an instruction from an operator to rewrite the filename is received in the rewriting selection step.

13. The document processing method according to claim 11, further comprising:

allowing an operator to select whether to rewrite a filename, wherein the filename rewriting step includes rewriting a filename of document data whose character string has been rewritten in the character string rewriting step when an instruction from an operator to rewrite the filename is received in the rewriting selection step.

14. The document processing method according to claim 8, wherein the document data is obtained by applying an OCR (Optical Character Recognition) process to an optically-read document.

15. A computer-readable storage medium recording a program for causing a computer to execute:

specifying character strings which have a common property across documents, from among character strings included in a plurality of documents which are represented by a plurality of corresponding document data;

rewriting, among character strings specified by the specifying process, character strings expressed in formats different from a defined format to character strings expressed in the defined format;

classifying formats of character strings specified in the specifying step; and defining a reference format based on a result of a classification in the classifying step, wherein the character string rewriting step includes rewriting, among character strings specified in the specifying step, character strings expressed in formats different from a reference format defined in the defining step to character strings expressed in the reference format; and wherein the defining step includes defining as the reference format a format with a highest appearance frequency from among formats classified in the classifying step.

* * * * *